TAPE RECORDING ERROR CHECK SYSTEM

Filed June 16, 1967 4 Sheets-Sheet 1

INVENTORS
CHARLES J. KENNEDY
KONRAD L. BYLER

May 5, 1970 C. J. KENNEDY ET AL 3,510,857

TAPE RECORDING ERROR CHECK SYSTEM

Filed June 16, 1967 4 Sheets-Sheet 2

INVENTORS
CHARLES J. KENNEDY
KONRAD L. BYLER

TAPE RECORDING ERROR CHECK SYSTEM

Filed June 16, 1967

4 Sheets-Sheet 3

INVENTORS
CHARLES J. KENNEDY
KONRAD L. BYLER

TAPE RECORDING ERROR CHECK SYSTEM

Filed June 16, 1967 4 Sheets-Sheet 4

*INVENTORS*
CHARLES J. KENNEDY
KONRAD L. BYLER

United States Patent Office 3,510,857
Patented May 5, 1970

3,510,857
TAPE RECORDING ERROR CHECK SYSTEM

Charles J. Kennedy, Altadena, and Konrad L. Byler, Pasadena, Calif., assignors to J. C. Kennedy Company, a corporation of California Filed June 16, 1967, Ser. No. 646,683
Int. Cl. G06k *5/00;* G11b *27/36*
U.S. Cl. 340—174.1 14 Claims

ABSTRACT OF THE DISCLOSURE

Data recorded on a magnetic tape is sensed during subsequent incremental advancement and applied to opposite channels wherein it is amplified and applied to a bistable device, the state of which is changed by sense reversals of the tape magnetization. A signal condition corresponding to the state of the bistable device is compared with the data input to the recorder to verify the recorded data. Amplification circuitry in the opposite channels is isolated from associated circuitry to prevent the false sensing of stray signals, and the system provides an error indication if the sensed recording is below a predetermined threshold value.

BACKGROUND OF THE INVENTION

Field of the invention

The present invention relates to systems for verifying the accuracy of signal information recorded on a magnetic tape, and more particularly to error check systems used with incremental digital data tape systems.

Description of the prior art

Various different arrangements have been proposed for insuring that incremental tape recordings correspond with the input data being recorded. Such systems may employ a separate magnetic head to derive a signal or signals corresponding to the recorded flux pattern on the tape. The derived signals may be processed as necessary and compared in some way with the original data input to verify the accuracy of the recordings.

The manner in which an error checking system operates and the actual components used will depend to some degree on the manner in which the data is recorded on the tape. Those systems using absolute flux levels to represent binary information involve different considerations than those utilizing other types of recording such as where flux changes represent the information. One important consideration is that any error in the actual recording be detected as quickly as possible so that the system may be immediately stopped or other appropriate action taken to correct the error before resumption of recording. Signals representing the sensed recording must typically be amplified to a usable level, and the amplification circuitry required may be driven in an unstable manner by a variety of different extraneous signals present. The amplification circuitry itself may provide unwanted signals which may result in a false reading by the error checking system.

In addition to the above considerations, it is often desirable to provide some indication when the recorded signal, whether it be correct or incorrect from an information standpoint, suffers from other deficiencies such as being too weak in magnitude to be usable. Factors such as a defective oxide coating along portions of the tape may themselves contribute to system error.

SUMMARY OF THE INVENTION

In brief, the present invention provides a system for checking the signal actually recorded on a magnetic tape against the data input and against other deficiencies which might arise in the recording process. The tape is AC erased so as to be magnetically neutral, and each recording thereon is sensed during subsequent incremental stepping of the tape to provide a signal indication in the form of a complementary pair of signals having a sense corresponding to the sense of tape magnetization. The complementary signals are amplified in opposite channels and applide to a bistable device, the state of which is reversed each time the sense of the complementary signals changes. First and second signal conditions corresponding to the state of the bistable device may then be compared with the input data to provide an error check. Since the tape is made magnetically neutral by AC erasure prior to recording the trailing edge of each recording may be sensed during subsequent stepping to provide complementary signals which are not affected by any prior recordings on the tape. The trailing edge is then overlapped by a part of the next recording to provide a suitable NRZI format.

In accordance with one particular aspect of the invention, the amplification circuitry used to amplify the complementary signals is isolated from harmful effects which may occur when undesired signals are present. During recording the input of the amplification circuitry is cut off from the associated head winding preventing ripple and other extraneous signal effects from having a harmful effect on amplification circuitry and the subsequent error checking operation. Upon termination of the recording, the amplification circuitry is coupled to the head winding but the output of such circuitry is maintained decoupled from the bistable circuit for a short period of time to prevent a false reading of transient signals which may occur.

In accordance with a further aspect of the invention, the bistable circuit fails to respond to amplified signals below a predetermined threshold level, providing an indication that some deficiency exists in the recording or the tape itself.

BRIEF DESCRIPTION OF THE DRAWING

The novel features of this invention, as well as the invention itself, both as to its organization and method of operation, may best be understood when considered in the light of the following description taken in connection with the accompanying drawings, in which:

FIGS. 3A through 3N are diagrammatic illustrations of various signal waveforms, gating functions, and tape velocity in the arrangement of FIG. 1 plotted as a function of time.

DETAILED DESCRIPTION OF THE PREFERRED EMBODIMENT

The error-checking circuitry of the present invention may best be understood when described and illustrated in connection with a digital incremental tape recording system. In such systems, data is typically recorded in a plurality of parallel tracks along the length of the tape, seven tracks and associated channels typically being used in order to provide compatibility with conventional data processing equipment. The magnetic tape is recorded in increments which may be referred to as data cells, all seven tracks in a given data cell being recorded simultaneously. At the completion of each data cell recording, the magnetic tape is advanced by a predetermined amount and a new data cell is recorded adjacent to or in some cases overlapping the previous cell. Each track recording within a data cell represents a bit of information, and the seven parallel tracks taken together comprise a character.

Figures 1, 2A, 2B:
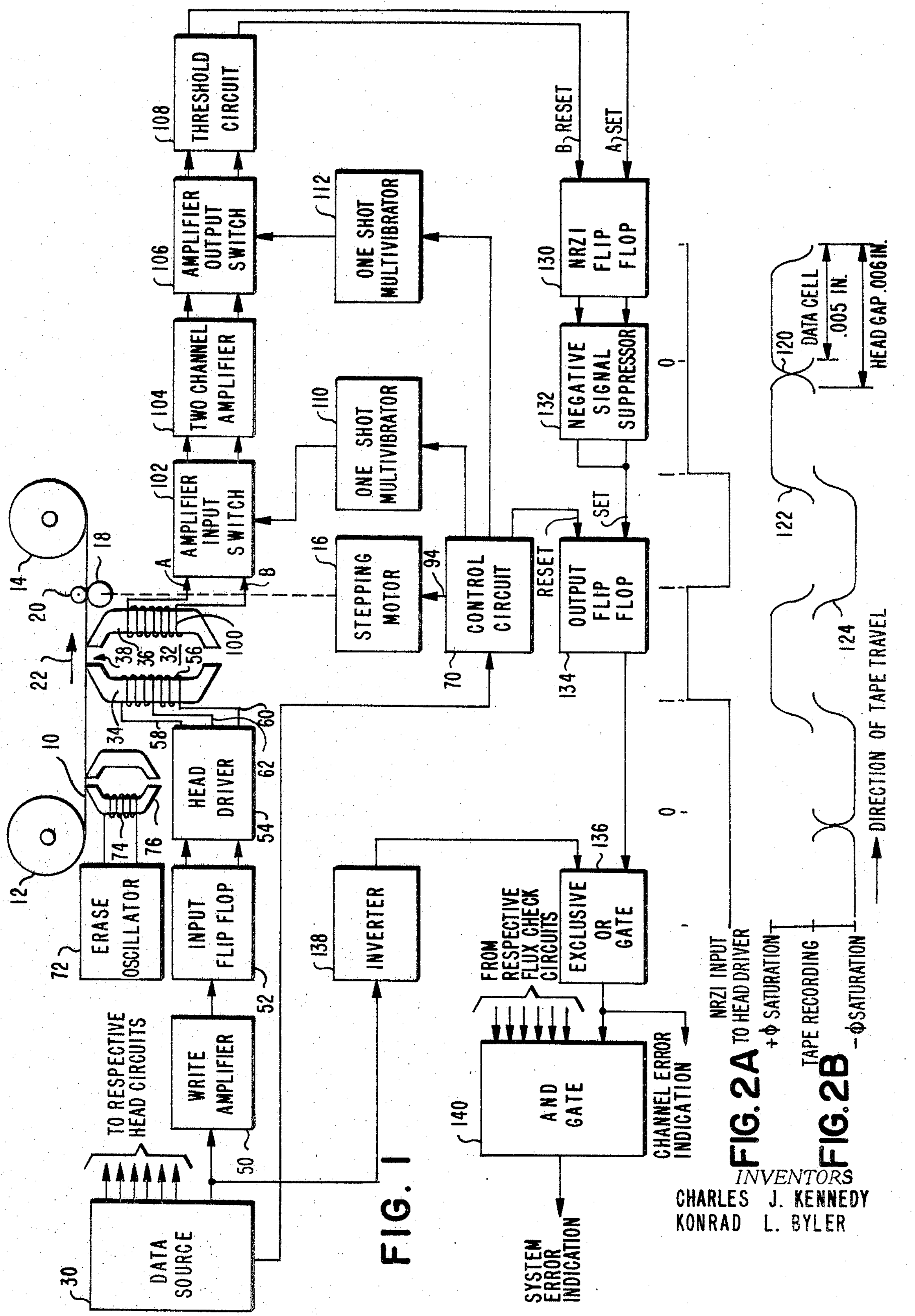
FIG. 1 is a block diagram of a preferred arrangement of an error checking system in accordance with the invention.
FIG. 2A is a diagrammatic illustration of a typical pattern of digital information in NRZI format such as may appear at the input of the head driver of the FIG. 1 arrangement to be recorded on a given length of tape.
FIG. 2B is a diagrammatic illustration of the recorded signal on the tape corresponding to the information illustrated in FIG. 2A.

FIG. 1 illustrates the write and error checking circuitry for a single tape track, the circuitry for the other six tracks which is identical being omitted for simplicity of illustration. The read winding and associated circuitry to be used during playback may assume any appropriate form, and have also been eliminated for the sake of simplicity. Thus, FIGS. 1 through 4 and the discussion to follow relate only to the writing of the information on the tape and the corresponding error checking operation.

A length of magnetic tape 10 is advanced from a supply reel 12 to a takeup reel 14 by a stepping motor 16 coupled to a capstan 18 and associated pinch roller 20. Upon engagement of the magnetic tape 10 by the capstan, momentary energization of the motor 16 advances the tape by a predetermined amount in the direction of the arrow 22. Tape transport details and the manner in which the tape is incrementally stepped are not important to an understanding of the invention, and it should be understood that other appropriate incremental drive arrangements may be used.

Information provided by a data source 30 is recorded on the tape by a magnetic head 32 which includes opposite pole pieces 34 and 36 separated by a non-magnetic gap 38 adjacent the tape 10. A separate magnetic head is used with each one of the seven information channels, such heads typically being arranged side by side to effect the simultaneous recording of all seven tracks in a given data cell. The bit signal in each channel, which may represent the information by varying between zero and a negative voltage, is amplified by a write amplifier 50 and applied to vary the state of an input flip-flop 52. Output signals from the flip-flop 52 are passed through a conventional head driver amplifier 54 to alternately energize the opposite ends of a center-tapped write winding 56 wrapped about the pole piece 34 in accordance with the desired recording sense.

The recording of information in binary fashion on a magnetic tape is typically effected by applying different signal levels to a write winding thereby subjecting the tape to different levels of magnetic flux which may arbitrarily represent binary "1" and binary "0." In many systems it has been found convenient to saturate the tape in opposite senses, a center-tapped write winding such as the winding 56 often being used for such purposes. Switching of the head driver 54 alternately energizes the top and bottom halves of the write winding 56 via the leads 58 and 60 and the return lead 62.

The arrangement of FIG. 1 employs NRZI recording wherein a binary "1" is represented by a change in the level of the recording and a binary "0" is represented by the absence of change. In the present instance such level changes comprise reversals in the sense of tape saturation between adjacent data cells. NRZI recording generally differs from other types of NRZ recording in that changes in recording level rather than the absolute value of the level represent information.

The data source 30 provides either zero or negative voltages to the write amplifier 50, each zero voltage representing a binary "0" and each negative voltage representing a binary "1." The input flip-flop 52 converts such voltages into an NRZI format for recording on the tape 10 by changing state each time an amplified negative voltage is received and by remaining in the same state when zero voltage is present at the write amplifier 50. The output of the flip-flop 52 is illustrated an FIG. 2A comprises a succession of positive and negative signals which alternately energize the write winding 56 via the head driver 54 in opposite senses to effect recording as shown in FIG. 2B. It is assumed in FIGS. 2A and 2B that recording begins at the right-hand end of the diagrams and proceeds toward the left. It will be noted from FIG. 2B that changes in the sense of tape magnetization correspond to binary "ones" and that the absence of changes denotes binary "zeros." It is therefore possible in NRZI recording for both positive and negative tape saturation to represent "zero" and for sense changes in either direction to represent "one." The input flip-flop 52 may include a gating circuit (not shown) at its input so as to operate the flip-flop in coincidence with externally applied clock pulses.

If a bit density of 200 bits per inch of tape length is to be used, each data cell will have a length of five thousandths of an inch as illustrated in FIG. 2B. Any bit density can be used within practical limits, densities of up to 500 or 600 bits per inch not being uncommon. To insure that the recordings do not return to zero between data cells, the head gap 38 adjacent the tape is made slightly larger than a cell length, in this instance approximately six thousandths of an inch, so that the trailing edge of each recording overlaps the leading edge of the succeeding recording as shown in FIG. 2B.

Normally, tape need not be erased prior to recording thereon since the recording itself erases any previous information. In the present arrangement however, erasure is necessary since the trailing edge of each recording is sensed to provide error checking prior to the next recording. Although any residual flux within the one-thousandth of an inch span between the end of the data cell and the end of the head gap wherein the trailing edge resides would be erased by the overlapping leading edge of the next recording, such flux could alter the trailing edge sufficiently so as to provide an improper error checking signal or no signal at all.

Conventional DC erasure which involves saturation of the tape in a predetermined sense will not work in the present arrangement since recordings of the same sense as the erase bias have no trailing edges. It is therefore necessary that the tape be erased so as to place it in a magnetically neutral state prior to recording, and this is accomplished using AC erasure. An erase oscillator 72 is selectively turned on to energize an associated winding 74 wrapped about an erase head 76. The head 76 is positioned adjacent the tape 10 and upstream from the write head 32 so as to effect erasure prior to recording on the tape. The oscillator 72 which is normally turned on may be disabled by an external signal during playback and rewind and at all other times when erasure is not desired. The frequency of the oscillator 72 is made sufficiently high so as to provide substantially complete erasure of the tape. For example, if the tape is being stepped at a speed of 30 inches per second and the frequency of the oscillator is 60,000 cycles per second, the one-thousandth of an inch space wherein the trailing edge of each recording resides will include at least two complete cycles of the oscillator or erase signal. It has been found that the presence of at least two cycles of the AC erase signal within the trailing edge space will not adversely affect the generation of the error checking signal, and at slower tape speeds the same oscillation frequency will provide an even greater number of cycles of the AC erase signal within the trailing edge space.

Figures 3A, 3B, 3C, 3D, 3E, 3F, 3G, 3H, 3I, 3J, 3K, 3L, 3M:
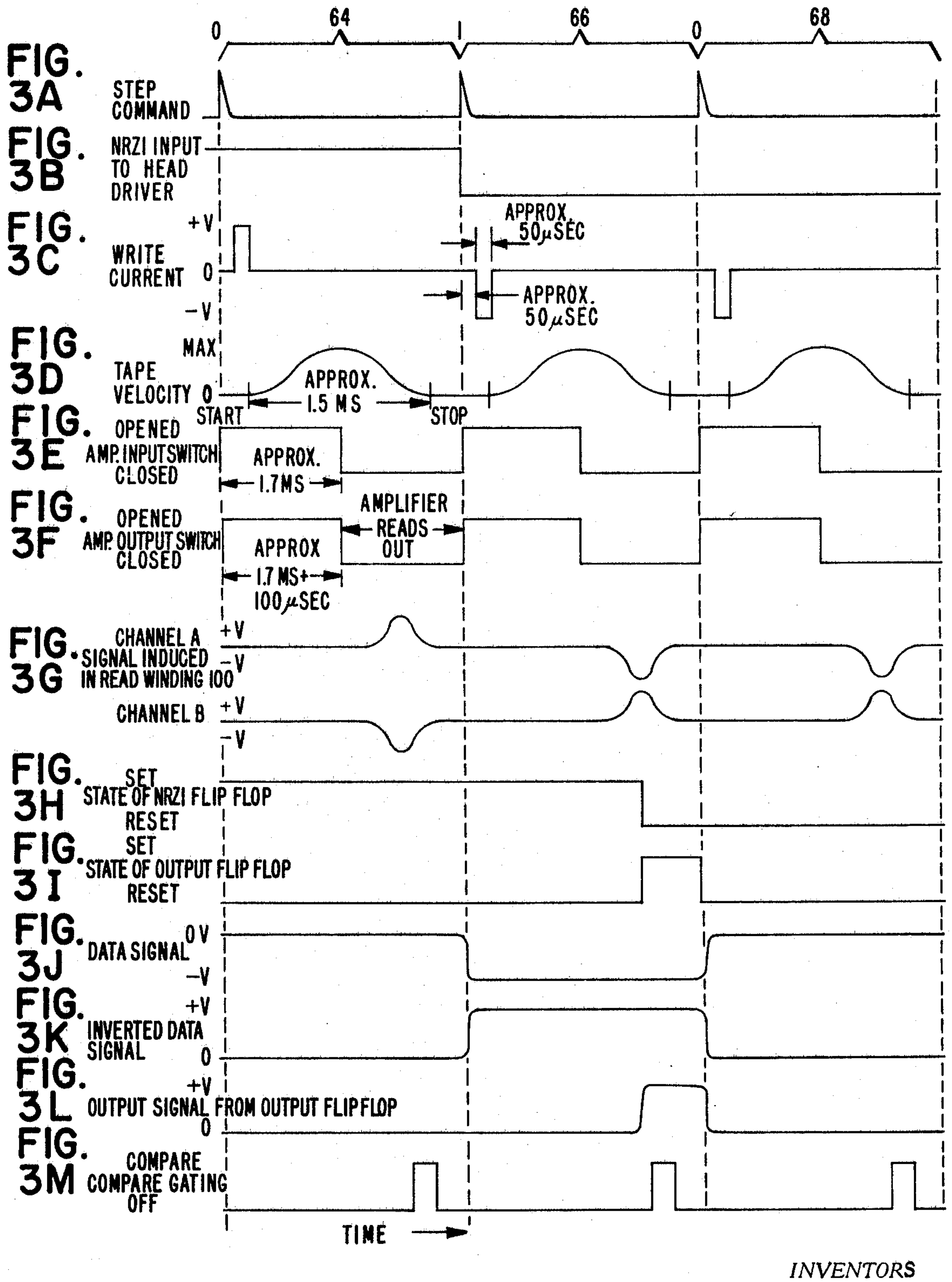

An understanding of the operation of the arrangement of FIG. 1 may be had in connection with the diagrammatic illustrations of FIGS. 3A through 3N which depict the timed sequence of events during three typical intervals of operation 64, 66 and 68. Each time a new character comprising seven parallel bits appears at the data source 30, a control circuit 70 initiates a step command pulse as illustrated in FIG. 3A. The control circuit 70 may be any appropriate type of conventional timing circuit which initiates a timed sequence of operations in response to an input signal. The intervals 64, 66 and 68 include the recording of three successive data cells, and the timed sequence of events is assumed to begin at the left-hand side of the diagrams and to proceed in a direction toward the right. The term "interval" is used in connection with the reference characters 64, 66 and 68 to define that period of time which is begun by the receipt of a step command and terminated by the beginning of an immediately subsequent step command, and which includes the recording of a single data cell and subsequent incremental stepping of the tape.

As shown in FIG. 3B it is assumed that the NRZI output of the flip-flop 52 is at the higher of its two levels and that a "0" is to be written on the tape during the first interval 64. Since zeros are represented by the absence of change in the magnetization level, the data signal remains high during the first interval 64 but drops to its lower level at the beginning of the second interval 66 where a "1" is to be written. Since a "0" is to be written during the third interval 68, the output of the flip-flop 52 remains at its lower level throughout the second and third intervals. The tape is saturated in a positive sense at the beginning of the first interval 64, and to maintain the tape in positive saturation during the interval 64 thereby writing a zero, a positive write current pulse as illustrated in FIG. 3C is applied to the write winding 56 of the head. The magnetic tape 10 is at rest at this point in time and remains at rest until the recording on the tape is completed. As shown in FIG. 3C a delay of approximately 50 microseconds occurs between the receipt of a step command and the application of a write current pulse to the magnetic head, allowing the overall system to respond to the step command. This delay may be provided by inhibiting the write amplifier 50, the input flip-flop 52 or the head driver 54. The write current is applied to the write winding 56 for approximately 50 microseconds, saturating the tape in the appropriate sense along the non-magnetic gap 38 in a manner as shown in FIG. 2B.

At the end of the recording the control circuit 70 provides a signal via a lead 94 to the stepping motor 16, to advance the tape. As shown in FIG. 3D the tape accelerates from rest to a maximum velocity, then decelerates to rest, the tape being advanced five thousandths of an inch. As the tape is advanced, a signal is induced in a read winding 100 wrapped about the right-hand pole piece 36 of the magnetic head 32. The induced signal corresponds to the change in the level of tape magnetization provided by the trailing edge of the recording, and appears as pulses representing the derivative of the tape flux. The induced signal in the read winding 100 may be represented in terms of its complementary components which appear at the opposite ends of the winding.

The opposite ends of the read winding 100 are coupled to the inputs of two separate channels A and B which include an amplifier input switch 102, a two-channel amplifier 104, an amplifier output switch 106, and a threshold circuit 108. During recording, various signals including relatively strong ripple signals are induced in the read winding 100. Such signals may have sufficient strength to adversely affect the operation of the amplifier 104 if applied to its channel inputs. For this reason, the input switch 102 which is serially coupled between the read winding 100 and the amplifier 104 is opened for a period of time sufficient to encompass the writing process, in this instance approximately 1.7 milliseconds. Upon receipt of the step-command pulse illustrated in FIG. 3A, the control circuit 70 initiates a one-shot multivibrator 110 to apply a signal to open the input switch 102 for approximately 1.7 milliseconds, the gating action provided by the input switch 102 being illustrated in FIG. 3E.

When the signal provided by the multivibrator 110 terminates, the input switch 102 closes to pass the signals in channels A and B to the inputs of the amplifier 104. At this time transient signals of short duration but nevertheless substantial amplitude may be passed through the amplifier 104 to provide a false output reading. Therefore, upon the closing of the input switch 102, the amplifier output switch remains open to isolate the amplifier output from the threshold circuit 108 for a period of time sufficient to allow transient dissipation, in this case approximately 100 microseconds. The output switch 106 is opened by a one-shot multivibrator 112 for the timed opening of the input switch 102 (1.7 milliseconds), plus 100 microseconds. When the signal provided by the multivibrator 112 terminates, the output switch 106 closes passing the amplified complementary signals in the channels A and B to the threshold circuit 108 without interference from unwanted signals.

As can be seen from FIGS. 3D, 3E and 3F, the signals which are subsequently amplified in channels A and B are induced in the read winding 100 as the tape decelerates from maximum velocity to rest. Since the induced signals represent the rate of change of flux or magnetization level, the read winding 100 in effect reads the trailing edge of each recording. Since the tape during the interval 64 is saturated in a positive sense, the induced signals correspond to a decreasing trailing edge such as the edge 120 shown in FIG. 2B. During the second interval 66 in which a "1" is written by reversing the saturation from positive to negative, the induced signals correspond to an increasing trailing edge such as the edge 124 shown in FIG. 2B. As shown in FIG. 3G the induced signal in the read winding 100 may be represented in terms of what the opposite inputs of the amplifier sense at the opposite ends of the read winding, the channel A and B signals being complementary in nature and having opposite senses, the signals having one set of senses when a positive magnetization of the tape returns to zero and an opposite set of senses when a negative magnetization of the tape returns to zero.

The threshold circuit 108 is a further device in the error checking arrangement of the present invention for detecting errors in the tape recording. The circuit 108 may be any appropriate device for insuring that signals in channels A and B below a predetermined threshold level will not switch an NRZI flip-flop 130 which is coupled to the threshold circuit. As will be more fully indicated from the discussion of FIG. 4 to follow, the threshold circuit 108 may comprise the final stage of the amplifier 104. Recorded signals which are too weak to be usable, such as may be due to defective oxide coating on the tape, are not amplified by the amplifier 104 to a level sufficient to switch the flip-flop 130.

The NRZI flip-flop 130 is switched only by those signals in channels A and B which are positive. During the interval 64 the set input of the flip-flop 130 which is coupled to channel A is energized by a positive pulse. However, since the flip-flop is assumed to already be in its set state from the previous interval, no change in state results. During the succeeding interval 66, however, a positive pulse in channel B is applied to the reset input of the flip-flop 130, switching the state of the flip-flop. Again during the next interval 68, a positive pulse in channel B is applied to the reset input but has no effect, since the flip-flop is already in its reset state. Signals appear at one or the other of the output terminals of the flip-flop 130 only when it changes state, and at all other times no output is provided.

The two output terminals of the NRZI flip-flop 130 are coupled through a negative signal suppressor 132 to the set input of an output flip-flop 134, the reset input of which is coupled to the control circuit 70. The negative signal suppressor 132 eliminates any negative going signals at the output of the flip-flop 130 which might constitute a false input to the output flip-flop 134. The output flip-flop 134 is changed to its set state each time the NRZI flip-flop 130 changes state. Since it is desirable that any effects of the NRZI flip-flop 130 on the output flip-flop 134 be removed at the beginning of each new interval, the output flip-flop is reset by the control circuit 70 at the beginning of each interval. Referring to FIG. 3I it is noted that the output flip-flop 134 is in its reset state at the beginning of the interval 64. Since the NRZI flip-flop 130 remains in its set state throughout the interval 64, the output flip-flop remains in its reset state. However, during the next interval 66, the NRZI flip-flop 130 is switched from its set to its reset state thereby switching the output flip-flop into its set state. At the beginning of the interval 68 a signal from the control circuit 70 switches the output flip-flop 134 back to its reset state. The output flip-flop 134 has a single output terminal coupled to one of a pair of inputs of an exclusive OR gate 136. When the output flip-flop 134 is in its reset state a condition of zero voltage exists at its output, and when in its set state a positive voltage appears at its output and is applied to the exclusive OR gate 136.

The data signal which is applied by the source 30 to the write amplifier 50 represents a binary "0" by zero voltage and a binary "1" by a negative voltage as shown in FIG. 3J. It is therefore necessary to invert the data signal by an inverter 138 as shown in FIG. 3K to provide the second input to the OR gate 136 in the same format as the signal from output of the flip-flop 134 illustrated in FIG. 3L. Toward the end of each of the intervals 64, 66 and 68 as shown in FIG. 3M, the inputs to the OR gate 136 are compared. If both OR gate inputs have a positive voltage or zero voltage a signal appears at the OR gate output indicating a no-error condition. On the other hand if one of the OR gate inputs has a positive voltage while the other is at zero, the OR gate output will be at zero voltage indicating an error in that particular bit channel. The output of the exclusive OR gate 136 provides a separate error indication of the channel and also constitutes an input of an AND gate 140. An error condition in any one of the seven channels will result in a condition of zero voltage at its corresponding input to the AND gate 140 providing an indication that an error exists somewhere in the overall system.

Figure 4A:
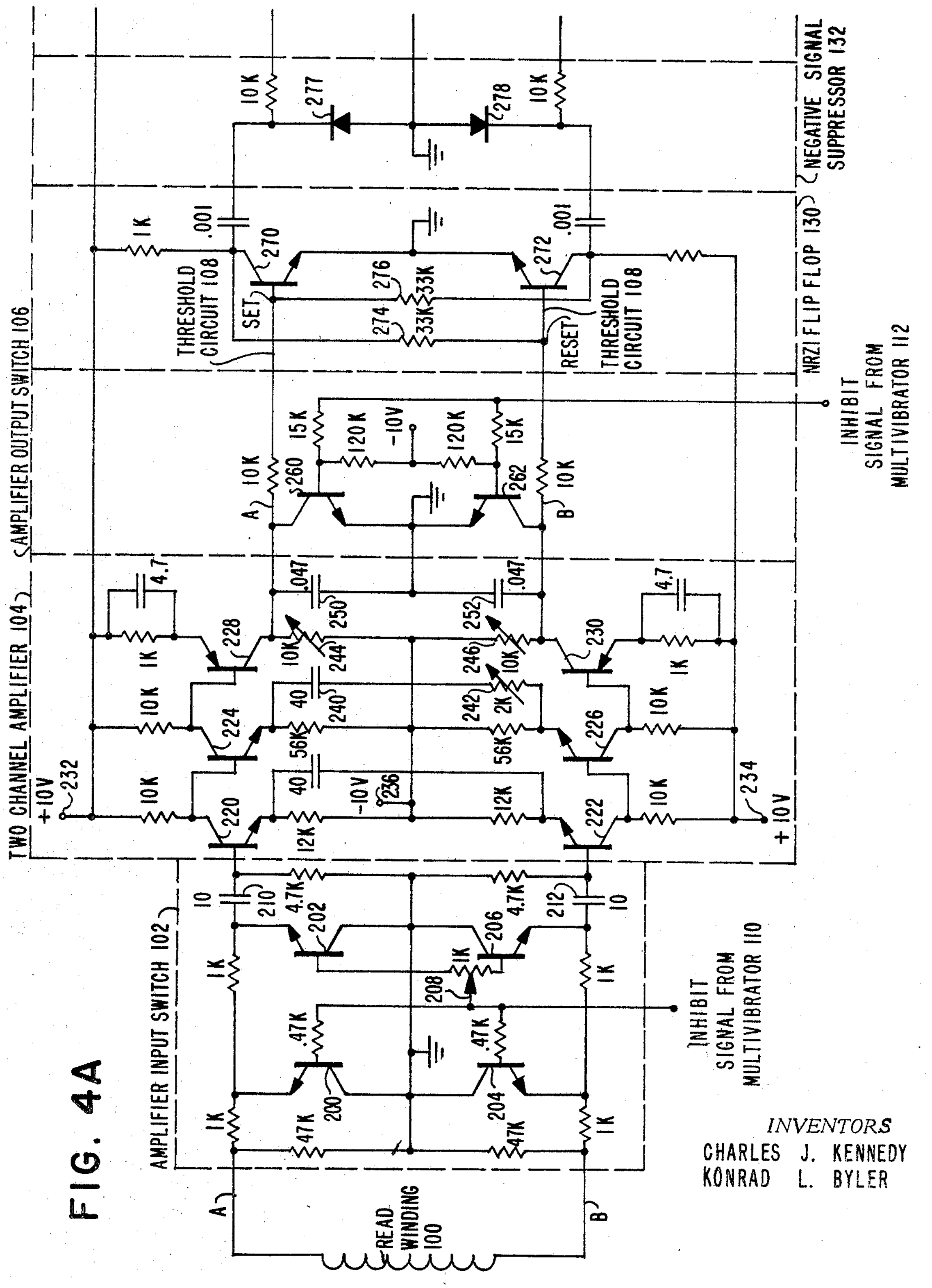
FIG. 4 is a detailed schematic diagram of a portion of FIG. 1, FIG. 4 comprising FIGS. 4A and 4B shown on separate sheets and interconnected as shown in FIG. 5.
Figure 5:
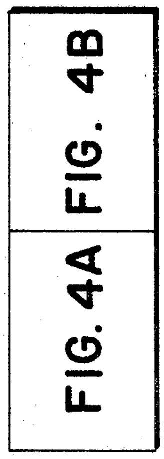
Figure 4B:
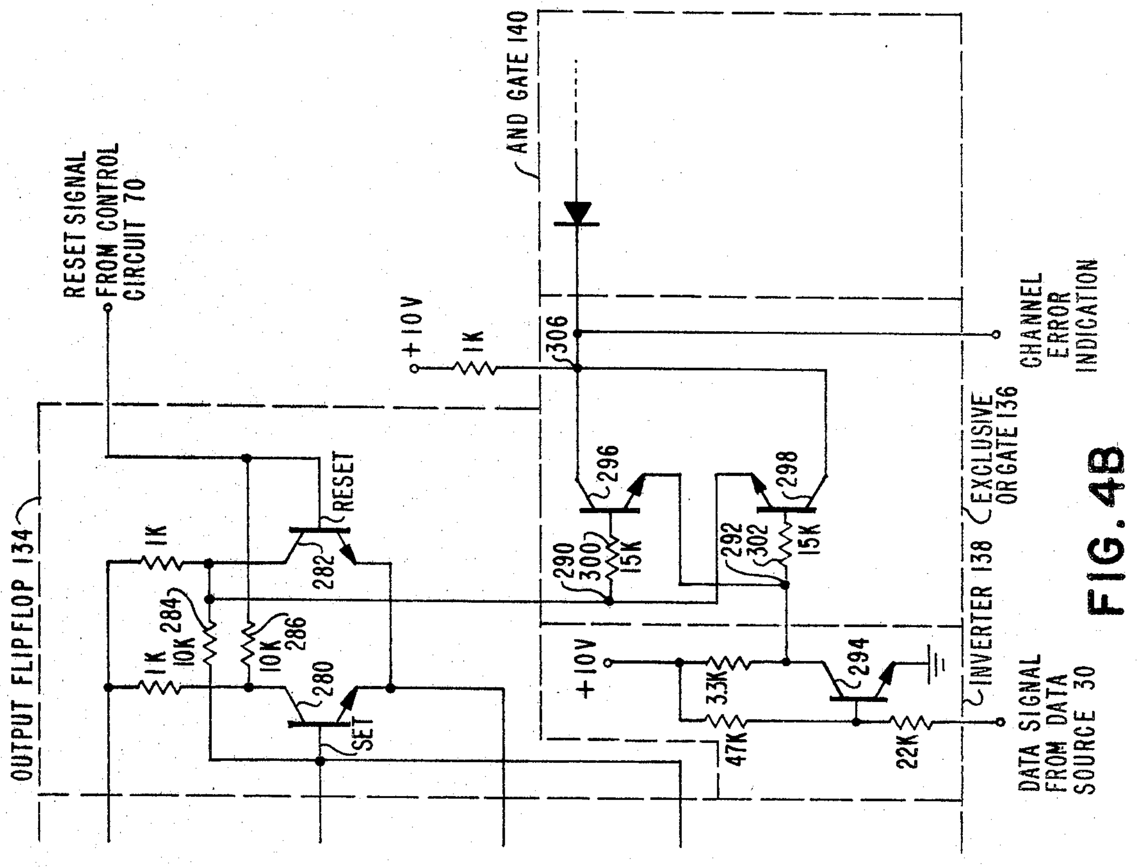

One particular circuit arrangement which may be used in the error-checking system of FIG. 1 is illustrated schematically in FIG. 4. The channels A and B which extend between the opposite ends of the read winding 100 and the set and reset inputs of the NRZI flip-flop 130 are identical and are therefore capable of handling positive and negative pulses in like manner. When it is desired to isolate the input of the amplifier 104 from the read winding 100, the inhibit signal from the multivibrator 110 is applied to the bases of opposite pairs of transistors 200, 202, 204 and 206 coupled between the opposite ends of the read winding and ground, causing conduction therein. The bases of the opposite pair of transistors 202 and 206 are coupled to receive the inhibit signal through a potentiometer 208 which may be adjusted as necessary to balance the opposite sides of the input switch 102. Blocking capacitors 210 and 212 are respectively coupled in the A and B channels between the input switch 102 and the amplifier 104 to prevent any direct current signals which may be sensed by the read winding 100 from reaching the amplifier inputs. The opening of the input switch 102 not only isolates the amplifier from the read winding, but also prevents the blocking capacitors 210 and 212 from becoming charged by unwanted AC or transient signals. As a result the blocking capacitors are AC charged only by the induced signals during error check, and their time constant in combination with the associated circuitry is such that they substantially or completely discharge after each error check to clear both channels in preparation for the immediately succeeding interval.

The two channel amplifier 104 is a 3-stage AC-coupled differential amplifier having three opposite pairs of transistors 220, 222, 224, 226, 228 and 230 coupled between opposite sources of positive potential 232, 234 and a common source of negative potential 236. The emitters of the second stage transistors 224 and 226 are coupled together through the serial combination of a capacitor 240 and a variable resistor 242 which may be varied as necessary to adjust the gain of the amplifier. The collectors of the third stage transistors 228 and 230 are coupled to the negative potential source 236 through respective variable resistors 244 and 246 which provide for channel balancing within the amplifier 104. The collectors of the third stage transistors 228 and 230 are also coupled to ground through respective capacitors 250 and 252 which comprise a spike suppressor eliminating unwanted transient signals which may appear at the amplier output.

Amplified signals at the collectors of the third stage transistors 228 and 230 which comprise the amplifier outputs are blocked from the set and reset inputs of the NRZI flip-flop 130 by conduction of a pair of transistors 260 and 262 in the output switch 106 which are respectively coupled between the A and B channels and ground. The transistors 260 and 262 conduct whenever the inhibit signal from the multivibrator 112 is applied to their bases.

With the amplifier output switch 106 closed and the transistors 260 and 262 in a state of non-conduction, amplified signals at the output of the amplifier 104 are applied to the bases of a pair of transistors 270 and 272 in the flip-flop 130 which are coupled between the positive sources of potential 232, 234 and ground. The collectors and base of the transistors 270 and 272 are appropriately cross-coupled through coupling resistors 274 and 276 to operate in flip-flop fashion, the flip-flop being in a set state when the transistor 270 conducts and in its reset state when the transistor 272 conducts. Negative signals in the flip-flop 130 are suppressed by a pair of diodes 277 and 278 coupled between ground and the collectors of the transistors 270 and 272, respectively.

A signal at the collector of that one of the transistors 270 and 272 which is conducting is passed to the base of a transistor 280 which comprises the set input of the output flip-flop 134. Reset signals from the control circuit 70 are applied to the base of a second transistor 282 in the flip-flop 134. The collectors and bases of the transistors 280 and 282 are appropriately cross-coupled through coupling resistors 284 and 286 to operate in flip-flop fashion. If the state of the NRZI flip-flop 130 is switched, indicating that a written "1" on the tape has been read, the transistor 280 is biased into conduction and the resulting positive potential at the end of the coupling resistor 284 opposite the base of the transistor 280 appears at one of the input terminals 290 of the exclusive OR gate 136. The other input terminal 292 of the OR gate is coupled to the collector of a transistor 294, coupled in conventional inverter fashion in the inverter circuit 138. As the transistor 294 alternates between conduction and non-conduction in response to the received data signal, signal conditions of zero voltage and positive voltage appear at the OR gate input terminal 292.

The OR gate 136 includes a pair of transistors 296 and 298 with their bases coupled through resistors 300 and 302 to the terminals 290 and 292 and their emitters cross-coupled to the opposite gate input terminal. The simultaneous presence of zero voltage or a positive voltage at the input terminals 290 and 292 results in a signal appearing at the gate output terminal 306 which is coupled to the collectors or both transistors 296 and 298 to indicate that there is no error in the channel. The signal at the output terminal 306 is applied as one of the necessary inputs of the AND gate 140 which is not shown in FIG. 4 and which can assume any appropriate form.

The schematic diagram of FIG. 4 is one arrangement constructed, tested and operated in accordance with the invention. The resistance values shown are in terms of ohms with the symbol "K" representing 1000 ohms. All values of capacitance illustrated are in microfarads. All transistors are of the type 2N2714 except the amplifier output stage transistors 228 and 230 which are of the type 2N3702. The diodes are of the type IN914.

It will accordingly be appreciated by those skilled in the art that the error checking arrangement of the present invention provides a positive and effective means for detecting various different types of error in the actual tape recording. The use of dual amplification channels in combination with a flip-flop provides signal conditions which may be readily compared with the input data signal to verify the accuracy of the recorded signal. The timed gating provided by switches at the input and output ends of the amplifier avoids false sensing of signals other than those induced in the read winding by the tape magnetization. Imperfections in the recording of any type of signal on the tape appear in the form of ineffective inputs to the NRZI flip-flop.

Although there has been described a specific arrangement of a magnetic tape error checking system in accordance with the invention for the purpose of illustrating the manner in which the invention may be used to advantage, it will be appreciated that the invention is not limited thereto. Accordingly, any and all modifications, variations or equivalent arrangements falling within the scope of the annexed claims should be considered a part of the invention.

What is claimed is:

1. In a system having at least one magnetic head for recording digital data on an erased magnetic tape incrementally, the combination including:

means coupled to said magnetic head for providing a signal indication of each recording on the tape during subsequent incremental stepping of the tape, the signal indications having like waveforms, and each signal indication having one or the other of opposite senses depending on the flux sense of the corresponding recording;

means responsive to the signal indication for providing a first signal condition when two successive signal indications have the same senses and a second signal condition when two successive signal indications have opposite senses; and means for comparing the first and second signal conditions with the digital data to provide an error indication when the digital data is not properly recorded on the tape.

2. The invention defined in claim 1 wherein the digital data is recorded by magnetically saturating the tape in opposite senses.

3. The invention defined in claim 1 wherein the means for providing the first and second signal conditions responds to the signal indication only when the indication exceeds a predetermined threshold value.

4. The invention defined in claim 1 wherein the means for providing a signal indication includes:

a winding disposed about the magnetic head and having a signal induced therein each time the tape is incrementally stepped;

means coupled to the winding for amplifying the induced signal to provide said signal indication; and means for decoupling the amplifying means from the winding during recording of the digital data on the magnetic tape.

5. The invention defined in claim 4 wherein:

the means for providing the first and second signal conditions is coupled to the amplying means; and the means for providing a signal indication further includes means for decoupling the means for providing the first and second signal conditions from the amplifying means during recording of the digital data on the magnetic tape and for a predetermined period of time thereafter.

6. The invention defined in claim 1 further including:

a read winding disposed about the magnetic head and having said signal indication induced therein each time the tape is incrementally stepped;

first circuit means coupled to one end of the read winding for providing the true value of said signal indication;

second circuit means coupled to the other end of the read winding for providing the complementary value of said signal indication;

and wherein the means for providing said first and second signal conditions includes a bistable circuit having a pair of input terminals each of which is coupled to a respective one of the first and second circuit means.

7. The invention defined in claim 6 wherein:

the bistable circuit provides the first or second signal condition at a pair of output terminals thereof;

and further including a second bistable circuit coupled to be switched into a first state when said second signal condition appears at the output terminals of the bistable circuit and to be switched into a second state after the tape is incrementally stepped and before a new recording of digital data is made.

8. An error checking circuit for use in an incremental magnetic tape system wherein at least one magnetic head adjacent a magnetic tape records digital data on an AC erased tape, comprising the combination of:

a winding disposed about the magnetic head;

a dual channel amplifier having a pair of input and output terminals;

first switch means coupling the input terminals of the amplifier to the opposite ends of the winding;

a flip-flop having a pair of input terminals; and second switch means coupling the output terminals of the amplifier to the input terminals of the flip-flop;

the flip-flop providing alternate signal conditions at its output in accordance with the sense of the data recording on the tape.

9. The invention defined in claim 8 wherein the flip-flop is unresponsive to signals at its input terminals which are below a predetermined threshold value.

10. The invention defined in claim 8 wherein the digital data is recorded on the tape in an NRZI format with binary "one" signals being represented by a change in the sense of the magnetization of the tape and binary "zero" signals being represented by the absence of a change in the sense of tape magnetization, each separate recording on the tape overlapping adjacent recordings to insure that the level of tape magnetization does not return to zero value.

11. The invention defined in claim 8 further including:

means for opening the first and second switch means at the beginning of a recording to decouple the amplifier from the winding and flip-flop; and means for closing the first and second switch means during subsequent incremental stepping of the tape so that a signal is induced in the winding which corresponds to the trailing edge of the recording.

12. The invention defined in claim 11 wherein the means for closing the first and second switch means closes the first switch means prior to closing the second switch means to prevent unwanted signals from being passed from the amplifier to the flip-flop.

13. The invention defined in claim 12 further including:

a second flip-flop;

means responsive only to those of the alternate signal conditions from the first flip-flop which are positive for switching the state of the second flip-flop; and means for switching the state of the second flip-flop after each incremental stepping of the tape.

14. The invention defined in claim 13 further including an OR circuit coupled to compare a signal representing the state of the second flip-flop with the digital data.

References Cited

UNITED STATES PATENTS

| | | | |
|---|---|---|---|
| 3,359,548 | 12/1967 | Yoshii et al. | 340—174.1 |
| 3,368,211 | 2/1968 | Taris | 340—174.1 |
| 3,413,625 | 11/1968 | Mitterer | 340—174.1 |

BERNARD KONICK, Primary Examiner

W. F. WHITE, Assistant Examiner